United States Patent
Jochim

Patent Number: 6,041,292
Date of Patent: Mar. 21, 2000

[54] REAL TIME STENOGRAPHIC SYSTEM UTILIZING VOWEL OMISSION PRINCIPLE

[76] Inventor: Carol Jochim, 3234 E. Corrine Dr., Phoenix, Ariz. 85032

[21] Appl. No.: 08/783,271

[22] Filed: Jan. 15, 1997

Related U.S. Application Data

[60] Provisional application No. 60/010,063, Jan. 16, 1996.

[51] Int. Cl.[7] ................................ G06F 17/28
[52] U.S. Cl. ................................ 704/3; 707/533
[58] Field of Search ............... 704/1, 3, 10; 707/533, 707/534

[56] References Cited

U.S. PATENT DOCUMENTS

| | | | |
|---|---|---|---|
| Re. 33,337 | 9/1990 | Lefler et al. | 707/533 |
| 4,566,065 | 1/1986 | Toth | 707/534 |
| 4,724,285 | 2/1988 | Lefler et al. | 341/90 |
| 4,765,764 | 8/1988 | Lefler | 400/91 |
| 4,777,596 | 10/1988 | Shaffer et al. | 707/534 |
| 4,858,170 | 8/1989 | Dewick, Sr. et al. | 707/534 |
| 4,893,238 | 1/1990 | Venema | 704/1 |
| 4,985,929 | 1/1991 | Tsuyama | 382/48 |

*Primary Examiner*—David R. Hudspeth
*Assistant Examiner*—Patrick N. Edouard
*Attorney, Agent, or Firm*—Gregory J. Nelson

[57] ABSTRACT

A computer-aided text processing stenographic system which is spelling independent. The system includes a keyboard which is stroked to translate verbal expressions into a phonetic code in accordance with a vowel omission principle in which all "uh" vowel sounds and unemphasized "eh" and "ih" vowel sounds preceding final side consonants are omitted for medial and ending strokes. The system further includes software to translate the strokes using a translation dictionary based on the vowel omission principle to provide accurate real-time translation. The system may also include a monitor for real time viewing of the text in English and may also include a printer and electronic storage. Other spelling dependencies and conflicts may be eliminated by representing the "aw" sound, vowel sounds preceding the letter "r" and schwa vowel sounds in a prescribed manner.

15 Claims, 8 Drawing Sheets

SCHEMATIC OF STENO SYSTEM

MACHINE SHORTHAND KEYBOARD

SCHEMATIC OF STENO SYSTEM

|  |  | CONVENTIONAL THEORY | JOCHIM THEORY |
|---|---|---|---|
| mentor | (1) | MEN/TOR | MEN/T-R |
| beggar | (17) | BEG/GAR | BEG/-R |
| pilfer | (2) | PIL/FER | PIL/F-R |
| elixir |  | E/LIX/IR | E/LIX/-R |
| perjure | (3) | PER/JUR | PUR/J-R |
| genesis | (4) | JEN/SIS | JEN/S-S |
| palace | (17) | PAL/LAS | PAL/-S |
| grievous |  | GRAOEV/OUS | GRAOEV/-S |
| bonus | (17) | BOEN/NUS | BOEN/-S |
| asbestos |  | AS/BES/TOS | AS/BES/T-S |
| dandruff |  | DAND/RUF | DAND/R-F |
| sheriff |  | SHER/IF | SHAIR/-F |
| gallop | (5) | GAL/OP | GAL/-P |
| turnip |  | TURN/IP | TURN/-P |
| proletariat |  | PROEL/TAIR/YAT | PROEL/TAIR/Y-T |
| Soviet |  | SOEV/YET | SOEV/Y-T |
| bracelet | (6) | BRAIS/LET | BRAIS/L-T |
| deficit | (7) | DEF/SIT | DEF/S-T |
| bigot | (8) | BIG/OT | BIG/-T |
| halibut |  | HAL/BUT | HAL/B-T |
| adequate |  | AD/KWAT | AD/KW-T |
| granite | (17) | GRAN/NIT | GRAN/-T |
| desperate |  | DES/PRAT | DES/PR-T |
| stallion |  | STAL/YON | STAL/Y-N |
| guardian |  | GARD/YAN | GARD/Y-N |
| basin | (9) | BAI/SIN | BAIS/-N |
| organ |  | O*R/GAN | OR/G-N |
| bargain | (10) | BAR/GAIN | BAR/G-N |
| ribbon | (17) | RIB/BON | RIB/-N |
| madam |  | MAD/AM | MAD/-M |
| harem |  | HAIR/EM | HAIR/-M |
| kingdom |  | KING/DOM | KING/D-M |
| gypsum |  | JIP/SUM | JIP/S-M |
| idiom |  | ID/YOM | ID/Y-M |
| cranium |  | KRAIN/HUM | KRAIN/Y-M |
| magic |  | MAJ/IK | MAJ/-K |
| havoc |  | HAV/OK | HAV/-K |
| myriad |  | MIR/YAD | MAOER/Y-D |
| period |  | PAOER/YOD | PAOER/Y-D |
| baggage | (15) | BAG/AJ | BAG/-J |
| college | (17) | KOL/LEJ | KAUL/-J |
| tenant | (17) | TEN/NANT | TEN/-NT |
| redolent | (16) | RED/LENT | RED/L-NT |

Fig. 2   Chart Demonstrating Spelling Dependency and Potential for Conflict of Conventional Theories vs. Jochim Theory Steno

| CONVENTIONAL THEORY STENO | CONFLICT CREATED |
|---|---|
| BAL/LAD | ballad/ball lad |
| BAL/LAI | ballet/ball lay |
| BAL/LOT | ballot/ball lot |
| BIL/LOE | billow/bill low |
| BAOK/KAOE | bookie/book key |
| KAIS/SON | caisson/case son |
| KAR/ROT | carrot/car rot |
| KOM MIGS | commission/come mission |
| KOM/MEND | commend/come mend |
| KON/NOET | connote/con note |
| KRAB/BI | crabby/crab by/crab bi- |
| DRAG/GON | dragon/drag gone |
| FEL/LOE | fellow/fell low |
| FIL/LAI | fillet/fill lay |
| FIL/LAMT | filament/fill lament |
| FUR/ROE | furrow/fur row |
| GET/TOE | ghetto/get tow |
| GLUT/TON | glutton/glut ton |

Fig. 3   Conflicts Created in Conventional Theories by Artificially Doubling Consonants

|  | CONVENTIONAL THEORY | CONFLICT | JOCHIM THEORY (CONFLICT-FREE) |
|---|---|---|---|
| adduct | AD/DUKT | add duct | U/DUKT |
| separates | SEP/RAT/-S | accept rats | SEP/R-TS |
| petrol | PET/ROL | pet roll | PET/R-L |
| cancel | KAN/SEL | can sell | KAN/S-L |
| tribal | TRAOI/BAL | try ball | TRAOIBL |
| sacred | SAIK/RED | sake red | SAIK/R-D |
| candid | KAN/DID | can did | KAN/D-D |
| ballad | BAL/LAD | ball lad | BAL/UD |
| accident | AX/DENT | ax dent | AX/D-NT |
| adjust | AD/J*US | add just | AD/J*S |
| bigamist | BIG/M*IS | big mist | BIG/M*S |
| booklet | BAOK/LET | book let | BAOK/L-T |
| camper | KAM/PER | cam per | KAM/P-R |
| Carson | KAR/SON | car son | KAR/S-N |
| catalyst | KAT/L*IS | cat list | KAT/L*S |
| chaplain | KHAP/LAIN | chap lain | KHAP/L-N |
| fraudulent | FRAUD/LENT | fraud lent | FRAJ/L-NT |
| gastric | GAS/TRIK | gas trick | GAS/TR-K |
| global | GLOE/BAL | glow ball | GLOEBL |
| goblet | GOB/LET | gob let | GAUB/L-T |
| guidance | GAOI/DANS | guy dance | GAOID/-NS |
| arctic | ARK/TIK | ark tick | ARK/T-K |
| circuit | SIR/KIT | sir kit | SUR/K-T |

Fig. 4  One word/two word Conflicts in Conventional Theories Automatically Circumvented by Jochim Vowel-omission Principle

| | JOCHIM THEORY (Circumvents Conflict) | | JOCHIM THEORY (Circumvents Conflict) |
|---|---|---|---|
| childbirth | KHAOILD/B-RGT | cold-blooded | KOELD/BL-D/-D |
| hairbrush | HAIR/BR-SH | sawbuck | SAU/B-K |
| turnbuckle | TURN/B-K/-L | rosebud | ROEZ/B-D |
| cloudburst | KLOUD/B*RS | salesclerk | SAELZ/KL-RK |
| blunderbuss | BLUND/-R/B-S | walnut | WAUL/N-T |
| short-circuit | SHORT/S-RK/-T | sparkplug | SPARK/PL-G |
| nightclub | NAOIT/KL-B | outcome | OUT/K-M |
| shortcut | SHORT/K-T | outdone | OUT/D-N |
| sawdust | SAU/D*S | piecrust | PAOI/KR*S |
| headfirst | HED/F*RS | schoolgirl | SKAOL/G-RL |
| handgun | HAND/G-N | homerun | HOEM/R-N |
| tailgunner | TAIL/G-N/-R | catgut | KAT/G-T |
| storefront | STOER/FR-NT | hardship | HARD/SH-P |
| thoughtful | THAUT/F-L | harmless | HARM/L-SZ |
| bracelet | BRAIS/L-T | sweatshirt | SWET/SH-RT |
| wanderlust | WAUND/-R/L*S | lonesome | LOEN/S-M |
| lackluster | LAK/L*S/-R | homespun | HOEM/SP-N |
| salesman | SAELZ/M-N | nonesuch | NUN/S-CH |
| salesmen | SAELZ/M*N | long-term | LAUNG/T-RM |
| wonderstruck | WUND/-R/STR-K | backward | BAK/W-RD |
| handiwork | HAND/AE/W-RK | glowworm | GLOE/W-RM |
| upturn | UP/T-RN | wetnurse | WET/N-RS |
| insomuch | N/SO/M-CH | overskirt | OEVR/SK-RT |
| Jackson | JAK/S-N | upsurge | UP/S-RJ |
| overhung | OEFV/H-NG | steelworker | STAOEL/W-RK/-R |
| underthrust | UND/-R/THR*S | kneejerk | KNAOE/J-RK |
| songbird | SAUNG/B-RD | trustworth | TR*US/W-RTH/AE |

Fig. 5   Compound Word Conflicts Circumvented by the Jochim Vowel-omission Principle LIST of (Dct) Personal Dictionary Sort: NO SORT
Data Type Selected: ALL TYPES OF ENTRIES

| | |
|---|---|
| >/S | is |
| >/S/-PBT | isn't |
| >/S/-PBT/R-R | isn't |
| >/T | it |
| >/K | can |
| >/K/TPH-T | cannot |
| >/K/*S | canst |
| >/K/TPH-TS | cannots |
| >/SK | ask |
| >/TK | de- |
| >/TK/TPRA/-L | defrayal |
| >/TK/TPRA/-LZ | defrayals |
| >/TK/O/TK-R/AOEUZ/-R | deodorizer |
| >/TK/PRO/PRE/OE/PHOET/AOU | de proprio motu |
| >/TK/PHRO/PHU | diploma |
| >/TK/PHRO/PH-T/*S | diplomatist |
| >/TK/PHRO/PHAES | diplomacy |
| >/TK/PHRO/PHAES/-Z | diplomacies |
| >/TK/RE/TKPW-R | de rigueur |
| >/TK/TAE | deity |
| >/TK/KRAE | decree |
| >/TK/KRAE/-G | decreeing |
| >/TK/KRAE/-D | decreed |
| >/TK/PWRAE | debris |
| >/TK/TKPWRAE | degree |
| >/TK/TKPWRAE/-D | degreed |
| >/TK/HRAE | dele |
| >/TK/HRAE/-G | deleing |
| >/TK/POE | depot |
| >/TK/TROE | de trop |
| >/TK/KRAOE | decree |
| >/TK/KRAOE/-G | decreeing |
| >/TK/KRAOE/-D | decreed |
| >/TK/U/TPAOEU | deify |
| >/TK/U/TPAOEU/-R | deifier |
| >/TK/U/TPAOEU/-RZ | deifiers |
| >/TK/U/TPOERPL | deiform |
| >/TK/U/TPAOEUG | deifying |
| >/TK/U/S-D | deicide |
| >/TK/U/TPAOEUD | deifide |
| >/TK/U/TPAOEUZ | deifies |
| >/TK/KU/SAEUT | decussate |
| >/TK/KU/SAEUT/-G | decussating |
| >/TK/KU/SAEUT/-D | decussated |
| >/TK/KU/SAEUTS | decussates |
| >/TK/KU/SAEUGZ | decussation |
| >/TK/PHU/TPHEU/KHRAE | demoniacally |
| >/TK/PHU/TPHEU/K-L | demoniacal |
| >/TK/KAOU/PHU/RAUL | Dicumarol |

FIGURE 7A

FILE: [Dct] Personal Dictionary

| Steno | Word |
|---|---|
| >/TK/KAOU/PH-R/AUL | Dicumarol |
| >/TK/PWAOU | debut |
| >/TK/TKPWHRAOU/TEUGZ | deglutition |
| >/TK/SEU/P-L | disciple |
| >/TK/SEU/P-LD | discipled |
| </TK/SEU/P-LZ | disciples |
| >/TK/TPHEU/-LZ | denials |
| >/TK/SREU/TPH-PL | divinum |
| >/TK/TREU/T-S | detritus |
| >/TK/KREU/-LZ | decrials |
| >/TK/STRAEU | distrait |
| >/TK/TPRAEU/-LZ | defrayals |
| >/TK/TPAOEU | defy |
| >/TK/TPAOEU/-R | defier |
| >/TK/TPAOEU/-R/R-R | deifier |
| >/TK/TPAOEU/R-R | deify |
| >/TK/TPAOEUPBT | defiant |
| >/TK/TPAOEUPBS | defiance |
| >/TK/TPAOEU/-D | defied |
| >/TK/TPAOEUZ | defies |
| >/TK/TPAOEU/-RZ | defiers |
| >/TK/TPAOEU/-RZ/R-R | deifiers |
| >/TK/TPHAOEU | deny |
| >/TK/TPHAOEU/-R | denier |
| >/TK/TPHAOEUL | denial |
| >/TK/TPHAOEUBL | deniable |
| >/TK/TPHAOEU/AEBL | deniably |
| >/TK/TPHAOEU/-D | denied |
| >/TK/TPHAOEU/-Z | denies |
| >/TK/TPHAOEU/-RZ | deniers |
| >/TK/TPHAOEULZ | denials |
| >/TK/SAOEUF | deciph |
| >/TK/S-R/TPH-R | discerner |
| >/TK/S-R/TPH-RZ | discerners |
| >/TK/T-R/PHU/TPH*S | determinist |
| >/TK/T-R/PHU/TPHAES/-Z | determinacies |
| >/TK/T-R/PHU/TPHEUS | determinis |
| >/TK/T-R/PHU/TPH*EUS | determinist |
| >/TK/T-R/PHU/TPH-RZ | determiners |
| >/TK/T-R/PH-PB/T-FB | determinative |
| >/TK/T-R/PH-PB/AEUT/-FB | determinative |
| >/TK/T-RG | deterring |
| >/TK/T-RPBT | deterrent |
| >/TK/T-RPBS | deterrence |
| >/TK/T-RPBTS | deterrents |
| >/TK/T-RD | deterred |
| >/TK/ST-R/PW-R | disturber |
| >/TK/ST-R/PW-PBS | disturbance |
| >/TK/ST-R/PW-RZ | disturbers |
| >/TK/TP-R/-R | deferrer |
| >/TK/TP-R/-RZ | deferrers |
| >/TK/PH-R | demur |
| >/TK/PH-R/-R | demurrer |

FILE: [Dct] Personal Dictionary

| | |
|---|---|
| >/TK/PH-RBL | demurrable |
| >/TK/PH-R/-PBLG | demurrage |
| >/TK/PH-R/-PBLG/-Z | demurrages |
| >/TK/PH-R/-D | demurred |
| >/TK/PH-R/-RZ | demurrers |
| >/TK/PH-R/-PBLGZ | demurrages |
| >/TK/SR-R | diver |
| >/TK/SR-R/SKWR-PBT | divergent |
| >/TK/SR-R/TAOES/PHAUPB | divertissement |
| >/TK/SR-R/TAOES/PHAUPBZ | divertissements |
| >/TK/SR-R/SKWR-PBS | divergence |
| >/TK/SR-R/SKWRAEPBS | divergency |
| >/TK/SR-R/SKWRAEPBS/-Z | divergencies |
| >/TK/SKWR-R/AE | de jure |
| >/TK/TKAR | deodar |
| >/TK/STOR | distor |
| >/TK/KOR/-PL | decorum |
| >/TK/KOR/T-BGT/-D | decorticated |
| >/TK/KOR/T-BGT/-RZ | decorticators |
| >/TK/KOR/-S | decorous |
| >/TK/POR/TAE | deportee |
| >/TK/POR/TAEZ | deportees |
| >/TK/HOR/T-T/OEUR | dehortatory |
| >/TK/TPHAOER | denier |
| >/TK/HRAOER | delir |
| >/TK/SKWRUR/AE | de jure |
| >/TK/SAEUR/PWR-T | decerebrate |
| >/TK/SAEUR/PWRAEUT | decerebrate |
| >/TK/SAEUR/PWRAEUT/-G | decerebrating |
| >/TK/SAEUR/PWRAEUT/-D | decerebrated |
| >/TK/SAEUR/PWRAEUTS | decerebrates |
| >/TK/SAEUR/PWRAEUGZ | decerebration |
| >/TK/SPAEUR | despair |
| >/TK/TKPWAEUR/KWRO/TAOEUP | daguerreotype |
| >/TK/TKPWAEUR/KWRO/TAOEUPZ | daguerreotypes |
| >/TK/TKPWAEUR/KWRU/TAOEUP | daguerreotype |
| >/TK/TKPWAEUR/KWRU/TAOEUPZ | daguerreotypes |
| >/TK/TKPWAEUR/TAOEUP | daguerreotype |
| >/TK/TKPWAEUR/TAOEUPZ | daguerreotypes |
| >/TK/TPHAEUR/OE | dinero |
| >/TK/TPHAEUR/KWR-S | denarius |
| >/TK/SRAEUR | divar |
| >/TK/KHRAEUR | declare |
| >/TK/KHRAEUR/-R | declarer |
| >/TK/KHRAEUR/TOEUR | declaratory |
| >/TK/KHRAEUR/T-FB | declarative |
| >/TK/KHRAEUR/-G | declaring |
| >/TK/KHRAEURPBT | declarant |
| >/TK/KHRAEURPBTS | declarants |
| >/TK/KHRAEUR/-D | declared |
| >/TK/KHRAEUR/-RZ | declarers |
| >/TK/KHRAEUR/T-FBZ | declaratives |
| >/TK/SWRAOEUR | desire |

REAL TIME STENOGRAPHIC SYSTEM UTILIZING VOWEL OMISSION PRINCIPLE

CROSS REFERENCE TO RELATED APPLICATION

This is a complete application based on provisional application Ser. No. 60/010,063, filed Jan. 16, 1996.

FIELD OF THE INVENTION

A computer-aided stenographic translation system utilizing a comprehensive vowel-omission principle which, when applied to the writing of machine shorthand: (1) eliminates spelling dependency, making it possible for machine shorthand to be learned more quickly and written more successfully by people with average spelling and vocabulary skills; and (2) eliminates conflicts, significantly enhancing the viability of real-time computer-aided translation of machine shorthand into English text.

A shorthand machine is a writing device having a keyboard with multiple keys which can be depressed simultaneously, generating one or more alphabetic or numeric characters simultaneously. Depending upon the data capturing capabilities of the specific shorthand machine, the characters generated are captured by: (1) imprinting them on a paper tape; (2) recording them electronically in the internal memory of the shorthand machine or on an electronic medium installed in the shorthand machine; (3) communicating them immediately and directly from the shorthand machine to a computer for storage or translation into English text; or (4) any combination of the above.

BACKGROUND OF THE INVENTION

There are many theories and systems for writing real time machine shorthand. Prior to computer translation of machine shorthand, the identical shorthand stroke frequently had one or more interpretations. Even computer systems cannot make the distinctions based on context. When writing real time machine shorthand, any steno stroke or series of strokes which could have more than one interpretation is a conflict.

Another problem that exists with conventional systems is spelling dependency. In order to eliminate conflicts, prior systems required a high degree of spelling skills.

A number of prior art patents disclose various stenographic translation systems including the following:

U.S. Pat. Nos. 4,858,170; 4,566,065; 4,724,285; 4,893,238; 4,777,596; RE33,337; and 4,041,467.

In view of the foregoing, there exists a need for an improved machine writing system which avoids conflicts and is not spelling dependent.

SUMMARY OF THE INVENTION

A real time machine shorthand system which captures data electronically as strokes are executed on a machine using a conventional steno keyboard. Generally a syllable is written with each stroke using various single or multiple keys to generate data representative of speech. Indicators, such as a slash or hyphen, indicate the beginning of a stroke and the side of the keyboard which has been stroked. A software program compares the electronic data with entries in a look-up dictionary and instantly converts the steno stroke or strokes to English text in real time. The system utilizes a vowel-omission theory in which the "uh" vowel sound and the unaccented "ih" and "eh" vowel sounds preceding final side consonants are omitted on medial and ending strokes. The look-up or translation dictionary provides English words corresponding to steno strokes are entered according to the vowel-omission theory.

BRIEF DESCRIPTION OF THE DRAWINGS

The above and other objects of the present invention will become more apparent and will be better understood from the following drawings in which:

FIG. 2 is a chart demonstrating spelling dependency and the potential for conflicts with conventional shorthand systems and the system of the present invention;

FIG. 3 is a chart illustrating conflicts existing in conventional shorthand theories by artificially doubling consonants;

FIG. 4 shows one word/two word conflicts existing in conventional theories which are avoided by the present invention;

FIG. 5 shows compound word conflicts circumvented by the vowel omission principle of the present invention;

FIGS. 7A, 7B and 7C are list of representative entries in the look-up or translation dictionary utilized with the present system.

DETAILED DESCRIPTION OF THE INVENTION

Figure 1:
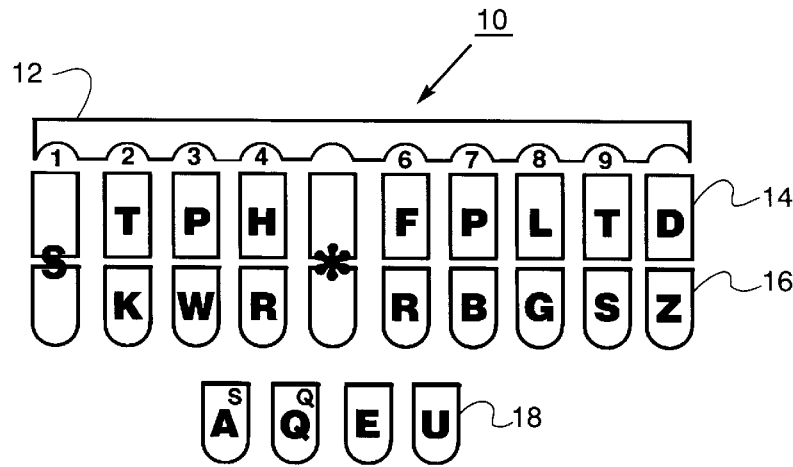
FIG. 1 is a representation of a conventional machine shorthand keyboard.

Turning now to the drawings, FIG. 1 is a representation of a conventional machine shorthand keyboard 10 and shows the number and placement of keys common to all machine shorthand keyboards manufactured for writing the English language. The top row 12 (solid bar) is a number bar. Depressing the number bar simultaneously with a key on the row immediately beneath it generates a numeric character 1 through 9.

The two long rows 14, 16 of 10 keys each are used to write consonant sounds. Keys to the left of the asterisk are stroked with left hand fingers to write consonant sounds at the beginning of a syllable. Keys to the right of the asterisk are struck with right-hand fingers to write consonant sounds at the end of a syllable.

The bottom row 18 contains four keys, positioned horizontally in the middle of the keyboard. The two keys positioned to the left of the asterisk are stroked with left thumb, the two keys positioned to the right of the asterisk are stroked with the right thumb. These four keys are depressed individually or in varying combinations to create the 14 primary vowel sounds in the English language.

A syllable is any sound which can be expressed in one exhalation of breath. There are four possible sequences of order for vowel and consonant sounds to create a syllable in the English language:

1. Vowel only (i.e.: a, I, you, owe)
2. Consonant(s) followed by a vowel (i.e.: be, my, to, pray)
3. Vowel followed by a consonant(s) (i.e.: it, ask, our)
4. Consonant(s)-vowel-consonant(s) (i.e.: put, take, start)

As FIG. 1 shows, the physical arrangement of the keys and the placement of the fingers and thumbs on the keys, the order in which alphabetic letters have been assigned to the keys, and the ability to depress multiple keys simultaneously, allows the operator to depress the requisite number of keys to create each of the four syllable structures, generating alphabetic characters in the proper order to write a complete syllable of the English language with each keyboard stroke.

When writing machine shorthand, consonants are written by SOUND. A "K" sound has many spellings but is always written in shorthand with a K. There is no alphabetic letter "C" on a machine shorthand keyboard: A "C" is always verbalized as an "S" or "K" sound. There are 21 consonants in the alphabet but only 20 consonant sounds for letters of the alphabet are needed on the left (beginning consonant) side of the keyboard. FIG. 1 shows 8 consonant keys on the left side of the keyboard, each representing an alphabetic letter. These 8 keys are also used in various combinations to create representations for the 12 remaining alphabetic consonant sounds: i.e., HR-stroked simultaneously represents a beginning consonant "L".

In the English language, H, Q, W and Y have no sound which is verbalized at the end of a syllable or word. Only 16 consonant sounds representing letters of the alphabet are needed on the right-hand side of the keyboard. The English language also has word endings consisting of combinations of consonant sounds (i.e., -ch, -sh, -th) which could not be written on a shorthand keyboard without assigning specific key combinations to those sounds. There are 10 consonant keys on the right (ending consonant) side of the keyboard, each representing an alphabetic letter. These 10 keys are also used in various combinations to create representations for the remaining 6 alphabetic ending-consonant sounds plus the additional consonant-combination ending sounds in the English language.

Machine Shorthand—The Theory

The "language" of machine shorthand, or the manner in which keys are combined to:

(1) Represent the alphabetic consonant sounds which have no single-key designation on the keyboard;

(2) Represent consonant-combination sounds;

(3) Represent vowel sounds;

(4) Create shortcuts;

(5) Eliminate conflicts; is called the machine shorthand theory.

At present, there are approximately 30 machine shorthand theories for writing the English language. According to the National Court Reporter's Association, 27 machine shorthand theories have been submitted to that Association for review, requesting approval to be taught in NCRA-approved schools.

All theories use the keyboard shown in FIG. 1 but differ in varying degrees in the manner in which they address items 1 through 5 above. For example, there is no assigned key for the letter Z on the left side of the keyboard. Some theories use S*, others use SWR, and others use STKPWHR to represent the Z-. Some theories use the left side T- to represent the word "it" and the right side -T for the word "the". Other theories reverse that. Some theories use -FPL to represent the consonant combination -mp, others use -FRPB.

Translating Machine Shorthand Characters into English Text

Prior to the early 1970's, the only function of shorthand machines was to imprint characters on a paper tape. The paper tape and the characters printed on it are referred to as shorthand notes or steno notes. To translate steno notes into English text, it was necessary for the operator to read the steno notes from the steno tape and type the words the steno notes represented or read the steno notes and then dictate them into a recording device to make a recording. The audio recording was then transcribed by using a typewriter.

In the early 1970's, technology was developed for capturing the shorthand machine keystrokes (steno notes) electronically and downloading that data to a computer. When a look-up table translation dictionary (containing steno strokes and the English text they represent) is loaded into the computer, a computer software program compares each steno stroke or series of steno strokes in the downloaded data against entries in the translation dictionary and translates any steno stroke(s) for which there is an exact match into English text. If no exact match is found, the steno stroke is left as untranslated steno.

In the mid-1980's, technology was developed for "real-time" computer-aided translation of machine shorthand. As each stroke or series of strokes is executed, the computer scans the look-up table dictionary resident in either the shorthand machine or in a computer, and instantly translates steno strokes to English text.

Spelling Dependency of Conventional Machine Shorthand Theories

Machine shorthand is non-spelling-dependent with respect to consonants; consonants are always written by sound.

When writing machine shorthand, vowel sounds are influenced by vowel spelling. Prior to computer-aided transcription of machine shorthand, spelling ability was not critical to the successful writing of machine shorthand. If the operator did not know the correct vowel spelling of a word, the operator simply wrote a representation for the vowel sound the operator heard. For computer-aided transcription, however, steno strokes written must exactly match an entry in a look-up table translation dictionary. Translation dictionaries for conventional machine shorthand theories are influenced by correct vowel spelling. Consequently, today's machine shorthand operator has to know that the "air" sound is spelled—and must be stroked—AR for parity, ER for perish, AR for tariff, ER for sheriff, AR for clarity but ER for cleresy, ER for hysteric but AR for fumaric; that defendant is spelled -ant, but dependent is spelled -ent. An operator must instantly recall and respond to correct spelling while writing at speeds of 225 to 240 words per minute to graduate from an NCR-approved school.

Recently published figures estimate the number of words in the English language at 400,000 to 800,000 words. Figures provided by the Linguistics Department, Arizona State University, show that the average adult has a "use vocabulary" of approximately 10,000 words, but no figures are available as to how many of the 10,000 words the average adult can spell correctly. These figures would indicate that, at best, the average adult can correctly spell less than 10% of the words in the English language. A machine shorthand theory which is spelling dependent excludes a majority of the adult population from successfully writing a large percentage of the English language in machine shorthand for real-time computer-aided translation.

Conflicts in Conventional Machine Shorthand Theories

In the English language, syllables identical in sound may be a word, a word beginning, or a word ending: i.e., "IN," "INN," "INtent" "robIN." This multiple use of identical sounds creates innumerable conflicts when writing machine shorthand.

Prior to computer-aided translation of machine shorthand, conflicts were resolved based on context as the steno notes were being read. Consequently, these conflicts had little impact and were seldom even recognized as conflicts or potential conflicts. The computer does not (except in limited, specific instances) recognize and translate according to context.

The most obvious conflicts are homonyms which are words with identical pronunciation but which are spelled differently and have different meanings: i.e., to, too, two; sent, cent, scent; guilt, gilt.

Conventional theories resolve homonym conflicts by devising steno representations for homonyms which are distinguished by spelling or by including an asterisk (*) in the steno stroke: i.e., TO, TAO, TWO; SENT, KRENT, SKRENT; GILT, G*ILT. The theory of the present system incorporates a unique option for homonym distinction. A keystroke (R—R) has been designated as a conflict distinction stroke which may be stroked immediately after the less-frequently-used homonym or the homonym with the less-common spelling, distinguishing it from its counterpart.

The most prevalent, and most difficult to resolve, conflicts in machine shorthand are those involving word boundaries. The computer translates a steno stroke: (1) As a word, followed by a blank space to separate it from the subsequent stroke; (2) As a word beginning, followed by a "delete space" command, causing it to attach to the subsequent stroke; (3) As a word ending, preceded by a "delete space" command, causing it to attach to the preceding stroke. Machine shorthand theories must now incorporate some means of identifying for the computer whether a stroke for a sound which could have multiple applications in the English language is to be translated as a word, word beginning or word ending.

For example, "en" is both a high-frequency word beginning and word ending. If a translation dictionary contains a specific entry for every word beginning with "en" and every word ending with "en", unless there is some specific distinction between "en" as a word beginning and word ending, potential for conflict still exists: i.e., "light enforce" will mistranslate as "lighten force", "light encounter" will as mistranslate as "lighten counter", etc. The sound "ree" is both a high-frequency word beginning and ending. Unless "ree" is distinguished as a word beginning or a word ending, the common steno strokes for "notary" and "renewed" result in "Was the note renewed" mistranslating as "Was the notary nude". Common steno for "Was the king domineering" will mistranslate as "Was the kingdom nearing".

The potential for conflicts in word boundaries when writing machine shorthand is persistent throughout the language, impacting a significant percentage of the words in the language. Best efforts by conventional theories to eliminate even the most obvious and pervasive conflicts have necessitated adding to those theories a multitude of complex rules which must be memorized and observed by operators when writing machine shorthand.

The successful writing of machine shorthand is far more dependent on mental agility than manual dexterity. The multiplicity of rules which must be memorized and observed by machine shorthand operators writing conventional machine shorthand theories, and the spelling dependency of those theories, have significantly increased demands on mental agility, reducing the number of people for whom successful writing of machine shorthand at marketable speeds is a viable skill, and have increased the time and expense of training to a point where they are prohibitive for the average person.

Machine Shorthand Theory

The present system has identified that the vowel spelling/sound dichotomy of the English language as it relates to machine shorthand is limited to three specific areas:

(1) "aw" sound

Conventional theories: If an "aw" sound is spelled with an "o", it is stroked with an O. If it is spelled with any other vowel or combination of vowels (a, au, aw, ou, ough, augh), it is stroked as AU Present theory: The "aw" sound is stroked AU, regardless of spelling.

(2) Vowel sounds preceding the letter "r"

Conventional theories: If the "air" sound is spelled "er", it is stroked ER. If it is spelled with any other vowel or combination of vowels (ar, air, aer, ear, are), it is stroked AIR.

If the "ear" sound is spelled "y" or "i", it is stroked "IR. If it is spelled with any other vowel or combination of vowels (er, ear, eir, ier, iere), it is stroked AOER.

The "ur" sound: shorthand strokes must conform to correct vowel spelling. The "ur" sound can be spelled with any vowel and several combinations of vowels.

Present theory: The sound "air" is stroked AIR, "ear" is stroked AOER, and "ur" is stroked -UR, regardless of spelling.

Note: A hyphen (-) preceding a letter in a steno stroke identifies that letter as being generated from the right side of the keyboard; a letter followed by a hyphen (-) identifies the letter as being generated from the left side of the keyboard.

A slash (/) indicates separation between strokes.

(3) Schwa vowel sound and unemphasized "ih" and "eh" sounds

Conventional theories: Shorthand strokes must conform to correct vowel spelling. The schwa vowel sound can be spelled with any vowel and several combinations of vowels.

Present theory: The schwa vowel and unemphasized "ih" and "eh" sounds are grouped together because they are virtually indistinguishable, with the unemphasized "ih" and "eh" sounds commonly being pronounced as a schwa vowel sound (i.e., pencil, ticket).

All schwa and unemphasized "ih" and "eh" vowel sounds are stroked as U.

The treatment of vowel sounds as outlined above, allows the operator to write both consonants and vowels by sound, creating a machine shorthand theory which is virtually spelling independent (spelling distinction is an optional method of distinguishing homonyms).

However, writing all vowels "by sound" increases conflicts in word boundaries. A machine shorthand theory which is spelling-independent would not be viable for real-time translation without also incorporating into the theory a comprehensive and effective method of circumventing conflicts.

The present invention achieves spelling independence by the following vowel-omission principle: MEDIAL AND ENDING STROKES: Omit all "uh" vowel sounds and unemphasized "eh" and "ih" vowel sounds preceding FINAL-SIDE consonants.

This principle reinforces spelling independence and lessens demands on hearing acuity by eliminating the need for the operator to distinguish between the three indistinct vowel sounds in the English language (uh, ih, eh). The principle also creates an automatic distinction between words/word beginnings and word endings, circumventing the vast majority of conflicts in word boundaries and eliminating the need for operators to memorize and implement as many as 20 and 30 rules for eliminating conflicts as required by conventional theories.

The chart in FIG. 2 demonstrates the consistency and spelling independence of steno notes written with the present theory as compared with those written with the leading conventional machine shorthand theory.

The source for all steno notes ascribed to a "conventional theory" is the StenEd Professional Reference Dictionary, Rev. 1991. StenEd is the current leader in the marketplace and is representative of the spelling dependency and rule intensity of the conventional theories which have made the strongest efforts to eliminate conflicts.

The conventional theory steno for many of the words in FIG. 2 creates potential conflicts.

The vowel-omission principle circumvents the type of word-boundary conflicts demonstrated above by creating an automatic distinction between word endings and word beginnings.

In the chart in FIG. 2, steno notes preceded by (17) indicate steno notes which require the operator to double a consonant, contrary to correct pronunciation and/or correct spelling. Artificially doubling consonants is a technique conventional theories have been compelled to adopt to avoid conflicts. Unfortunately, the practice frequently CREATES conflicts. The vowel-omission principle makes it unnecessary to ever artificially double consonants and create the type of conflict demonstrated in FIG. 3.

There are hundreds of words in the English language which create potential conflicts when writing machine shorthand because the steno strokes representing one word could also represent two different words. FIG. 4 demonstrates one word/two word conflicts in conventional theories which are automatically circumvented by the vowel-omission principle.

Referring to FIG. 5, there are hundreds, perhaps thousands, of compound words in the English language which require special distinction to avoid conflicts when writing machine shorthand. Conventional theories resolve the conflict by (1) incorporating an asterisk into a stroke, (2) executing a "delete space" command to join two words or (3) executing an "insert space" command to separate two words. The vowel-omission principle is again applied to circumvent hundreds of compound word conflicts, eliminating the need for incorporating an asterisk or executing "delete space" or "insert space" commands.

Although only one example of each "ending word" is included in the examples of compound words shown in FIG. 5, each "ending word" may be applicable to many compound words: i.e., salesman, gunman, workman, foreman, etc.

Vowel-omission Principle

The vowel-omission principle is specific in each element of the principle: (1) the specific strokes from which vowels must be omitted (medial and ending); (2) the specific vowel sounds which must be omitted (ALL "uh" vowel sounds and unemphasized "eh" and "ih" vowel sounds; (3) and the specific circumstances under which they are to be omitted (preceding FINAL-SIDE consonants).

A comprehensive vowel-omission principle which lacks this specificity or deviates from these specifics would not be appropriate or effective.

Specific vowel sounds to be omitted:

(1) Including any vowel sounds other than "uh", "eh", and "ih" (the unvoiced vowels) in a vowel-omission principle creates innumerable additional conflicts between word beginnings and endings and is not viable. It would also seriously detract from facility in reading steno notes.

(2) If the "uh" sound is not included in the vowel-omission principle, spelling dependence is not eliminated.

The "uh" vowel sound is the most frequently-occurring vowel sound in the English language and can be spelled with any vowel or any combination of vowels. Eliminating spelling dependency of the "uh" vowel sound is the primary element in eliminating spelling dependency.

The most logical solution to eliminating spelling dependency of the "uh" vowel sound would be to assign a specific vowel key or combination of vowel keys to represent the "uh" sound. There is no unused vowel key or combination of vowel keys available on the keyboard to be used for that purpose.

Another option for eliminating spelling dependency of the "uh" vowel sound would be to represent the "uh" vowel sound with the "U" vowel key. Again, doing so would create innumerable additional conflicts between word beginnings and word endings: uh-, -ul; un-, -un; ur-, -ur; etc.

The remaining option for eliminating spelling dependency of the "uh" vowel sound is its omission.

(3) If the "eh" sound is not included in a vowel-omission principle, word boundary conflicts remain between el-, -el and le; en-, -en; em-, -em, er-, -er; etc.

(4) If the "ih" sound is not included in a vowel omission principle, word boundary conflicts remain between il-, -il; id-, -id; in-, -in; im-, -im; ir-, -ir; is-, -is; it-, -it; etc.

A viable vowel-omission principle for writing machine shorthand must include, and be limited to, the "uh", "eh", and "ih" sounds.

Specific steno strokes from which vowels are to be omitted:

A vowel-omission principle which omitted the designated vowel sounds from ALL steno strokes would not create a distinction between word beginnings and word endings and would not resolve word boundary conflicts.

A vowel-omission principle which omitted those specific vowel sounds from only ENDING strokes would eliminate spelling dependency from ending strokes only.

If vowel omission applied to only final strokes: "al" is the final stroke for "local", the vowel would be omitted, and the stroke would be /-L: but in "localize", "al" becomes a medial stroke, the vowel would NOT be omitted and the correct stroke would be /A-L, which would be spelling dependent and would create inconsistencies confusing to the operator.

For maximum elimination of spelling dependency and for maximum consistency, a viable vowel-omission principle for writing machine shorthand must omit the specific vowel sounds from both medial and ending strokes, and only medial and ending strokes.

Specific circumstances under which vowels are to be omitted from medial and final strokes: Preceding final-side consonants.

Many syllables in the English language and consequently many medial and final shorthand strokes, end with a vowel sound. Omitting the vowel sound from a syllable ending in a vowel sound would create conflicts and significantly reduce facility in reading the steno notes. I.e., "parka" can be stroked in machine shorthand as (1) /PARK/-U or (2)

PAR/KU. If the final-stroke vowel is eliminated in (1), the steno would be /PARK, the word "park". If the final-stroke vowel is eliminated in (2), the steno would be /PAR/K-, which would be extremely difficult to read and would also create a conflict: Many beginning-side consonant letters are used in machine shorthand as representations for high-frequency words. K- is used universally in machine shorthand theories to represent the word "can" and the steno /PAR/K- would represent "par can".

Figure 6:
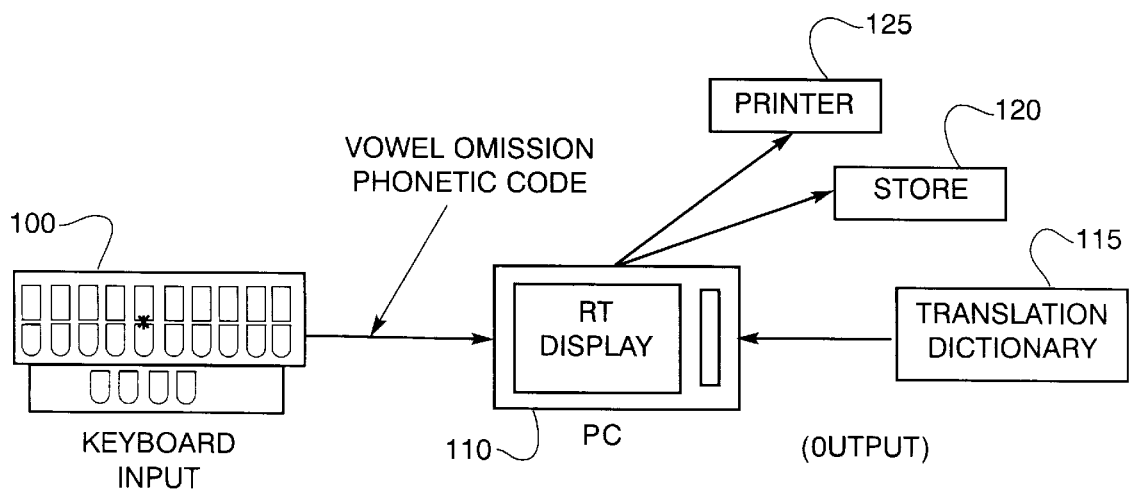
FIG. 6 is a schematic representation illustrating the components of the system for implementing the theory.

FIGS. 7A, 7B and 7C set forth a representative portion of the look-up or translation dictionary that utilizes the principles set forth above. Commonly used terms are incorporated and the steno writer can, by applying the vowel omission principle, create his or her own dictionaries. The dictionary is embodied or stored in a data base which is part of the system shown in FIG. 6. The translation system of FIG. 6 includes a keyboard 100 which is conventional as shown in FIG. 1. The keyboard output in the form of phonetic code is provided as an input to a personal computer or processor 110 which may include a display or monitor 112. The computer includes a software program (CAT or Computer Aided Translation) that compares electronic data representative of spoken words generated in accordance with the vowel omission principle with entries in the translation dictionary 15. The dictionary entries are as shown in FIG. 7. The software program instantly converts the steno strokes to corresponding English text in real time. The output in English may be stored on disc or tape at 120 or printed by printer 125.

The keyboard, display and CAT program may be integrated into a single unit such as the Stentura 8000 available from Stenograph Corporation. CAT programs such as Rapid Write which work with DOS-based word processing packages may be used.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A real time, spelling-independent stenographic system comprising:

(a) input means having a keyboard for generating electronic data representing the shorthand strokes;

(b) storage means for storing the electronic data;

(c) a translation dictionary of the steno strokes and the corresponding English text in which "uh" vowel sounds and unemphasized "eh" and "ih" vowel sounds preceding final side consonants are omitted from medial and ending strokes; and (d) means for comparing the electronic data and the translation dictionary and converting the steno strokes to English text.

2. The system of claim 1 wherein said means for comparing the electronic data and the translation dictionary comprises a computer translation program.

3. The system of claim 1 wherein said keyboard is a stenographic machine keyboard and wherein all schwa and unemphasized "ih" and "eh" vowel sounds are represented as "U" in the translation dictionary.

4. The system of claim 3 wherein the sound "AW" is represented as "AU" in the translation dictionary.

5. The system of claim 4 wherein "AIR" is represented as "AIR", "EAR" as "AOER" and "UR" is represented as "-UR" in the translation dictionary.

6. The system of claim 5 wherein a hyphen (-) preceding a letter in the translation dictionary is used to indicate it was generated from the right side of the keyboard.

7. The system of claim 6 wherein a slash (/) in the translation dictionary indicates separation of strokes.

8. The system of claim 7 wherein "R—R" in the translation dictionary indicates conflict resolution.

9. A system for the computer-aided translation of spoken language into an output comprising:

(a) a stenographic machine having a conventional keyboard for generating electronic data representative of vowel sounds;

(b) a translation dictionary including the steno strokes and the corresponding English text according to a theory in which a syllable is represented by a stroke and "uh" vowel sounds and unemphasized "eh" and "ih" vowel sounds preceding final side consonants are omitted from medial and ending strokes;

(c) a processor for receiving the electronic data and comparing the electronic data; and (d) generating a real time output in English text.

10. The system of claim 9 wherein the output is a display.

11. The system of claim 9 wherein the output is electronically stored.

12. A method for computer-aided translation of stroke symbols including:

(a) providing a spelling independent theory in which each syllable is represented by a stroke on a conventional machine shorthand keyboard and in which all "uh" vowel sounds and unemphasized "eh" and "ih" vowel sounds preceding final side consonants are omitted from medial and final strokes;

(b) generating electronic data representative of said strokes;

(c) providing a look-up dictionary of steno strokes according to the theory and corresponding English text; and (d) generating English text in real time.

13. A method of reconstructing and displaying language following the transcription of spoken language in accordance with a vowel-omission stenographic system which comprises the steps of:

(a) identifying and deleting all "uh" vowel sounds and unemphasized "eh" and "ih" vowel sounds preceding final consonants from the spoken language;

(b) entering the remaining syllables of the spoken language into a first memory via a stenographic keyboard;

(c) continually comparing the contents of the first memory with a stored translation dictionary to reduce conflict between word boundaries; and (d) displaying the reconstructed language.

14. The method in accordance with claim 13 further comprising the steps of creating a translation dictionary and starting said dictionary in a second memory.

15. The method in accordance with claim 14 wherein the step of entering syllables into a first memory comprises using a stenographic keyboard to generate the input to said first memory.

* * * * *